United States Patent
Yamazaki et al.

(10) Patent No.: US 7,441,626 B2
(45) Date of Patent: Oct. 28, 2008

(54) RACK-AND-PINION STEERING APPARATUS

(75) Inventors: Takayasu Yamazaki, Tenri (JP); Shirou Nakano, Osaka (JP)

(73) Assignee: JTEKT Corporation, Osaka (JP)

( * ) Notice: Subject to any disclaimer, the term of this patent is extended or adjusted under 35 U.S.C. 154(b) by 148 days.

(21) Appl. No.: 11/188,647

(22) Filed: Jul. 26, 2005

(65) Prior Publication Data
US 2006/0042863 A1  Mar. 2, 2006

(30) Foreign Application Priority Data
Aug. 24, 2004 (JP) .............................. 2004-243724

(51) Int. Cl.
*B62D 5/04* (2006.01)
(52) U.S. Cl. ...................... 180/444; 180/428
(58) Field of Classification Search ................ 180/428, 180/444; 280/93.514, 93.515; 74/842, 29
See application file for complete search history.

(56) References Cited

U.S. PATENT DOCUMENTS

| | | | | |
|---|---|---|---|---|
| RE28,740 E | * | 3/1976 | Bishop | 74/422 |
| 4,116,085 A | * | 9/1978 | Bishop | 74/422 |
| 4,189,955 A | * | 2/1980 | Bishop | 74/498 |
| 4,382,389 A | * | 5/1983 | Namiki et al. | 74/422 |
| 6,390,230 B1 | * | 5/2002 | Shimizu et al. | 180/444 |
| 6,543,569 B1 | * | 4/2003 | Shimizu et al. | 180/444 |

FOREIGN PATENT DOCUMENTS

JP  6-115440 A  4/1994

* cited by examiner

*Primary Examiner*—Lesley D. Morris
*Assistant Examiner*—Maurice Williams
(74) *Attorney, Agent, or Firm*—Birch, Stewart, Kolasch & Birch, LLP

(57) ABSTRACT

The present invention provides a rack-and-pinion steering apparatus capable of effectively reducing reverse input, while a high degree of design freedom is secured. The sum of the tilt angle of a rack tooth with respect to a reference line perpendicular to the axial line of a rack shaft and the tilt angle of a pinion tooth with respect to the axial line of a pinion shaft does not coincide with the tilt angle of the axial line of the pinion shaft with respect to the reference line. Crowning is given on the tooth surface of the rack tooth (or the pinion tooth) in order to decrease the tooth width on one end side in the direction of tooth trace and to increase the tooth width on the other end side according to the state of contact with the pinion tooth (or the rack tooth) opposed thereto.

10 Claims, 5 Drawing Sheets

RACK-AND-PINION STEERING APPARATUS

CROSS-REFERENCE TO RELATED APPLICATIONS

This Nonprovisional application claims priority under 35 U.S.C. § 119(a) on Patent Application No. 2004-243724 filed in Japan on Aug. 24, 2004, the entire contents of which are hereby incorporated by reference.

BACKGROUND OF THE INVENTION

The present invention relates to a rack-and-pinion steering apparatus, which includes pinion teeth provided on the circumferential face of a pinion shaft, and rack teeth provided on the outer face of a rack shaft and engaged with the pinion teeth, wherein the rotation of the pinion shaft connected to a steering member is transmitted to the rack shaft via the engagement portions of the pinion teeth and the rack teeth, and the rack shaft is moved in the axial direction thereof to steer.

Such a rack-and-pinion steering apparatus is widely used as a steering apparatus for vehicles, such as automobiles, and includes a pinion shaft connected to a steering member, such as a steering wheel, pinion teeth being provided on the circumferential face of the pinion shaft, and a rack shaft extended in the right-left direction of a chassis, rack teeth being provided on the outer face of the intermediate portion of the rack shaft along an appropriate length, wherein the rotation of the pinion shaft corresponding to the operation of the steering member by the driver is converted into the movement in the axial direction of the rack shaft to steer wheels to be steered (generally, right and left front wheels) respectively connected to both right and left ends of the rack shaft via tie rods.

In this type of rack-and-pinion steering apparatus, for the purpose of restricting reverse input, such as kickback and flutter, at least one of the tilt angle of the rack tooth (hereafter referred to as rack helix angle) $\theta r$ with respect to a reference line perpendicular to the axial line of the rack shaft and the tilt angle of the pinion tooth (hereafter referred to as pinion helix angle) $\theta p$ with respect to the axial line of the pinion shaft is set so as to be larger than the tilt angle of the axial line of the pinion shaft (hereafter referred to as housing intersection angle) $\theta h$ with respect to the reference line. Hence, in the case that an energizing force exerted by energizing means is set at a large value so that reverse input, such as kickback and flutter, can be reduced, it is difficult to properly convert the movement between the pinion shaft and the rack shaft. As a result, there is a problem of degrading steering wheel returning performance, steering feeling, etc.

For the purpose of solving this problem, Japanese Patent Application Laid-Open No. H6-115440 has disclosed a steering apparatus wherein friction during engagement between the pinion teeth and the rack teeth is reduced by decreasing the pinion helix angle $\theta p$ so that the movement conversion between the pinion shaft and the rack shaft can be carried out properly and efficiently. With this configuration, an energizing force exerted to the rack shaft by energizing means can be set at a larger value, a minute relative displacement between the pinion shaft and the rack shaft can be absorbed effectively by the friction during engagement between the rack teeth and the pinion teeth, and reverse input, such as kickback and flutter, can be reduced while steering wheel returning performance, steering feeling, etc. are prevented from becoming deteriorated.

However, in the above-mentioned steering apparatus, in the case that the diameter of the pinion shaft is set constant, stroke ratio is reduced by decreasing the pinion helix angle $\theta p$. Hence, the range in which the pinion helix angle $\theta p$ can be decreased cannot be increased in design. In addition, the diameter of the pinion shaft is restricted because of the space around the steering gear. Therefore, the practical design range of the steering apparatus is limited to a very narrow range, and there is a problem of having almost no degree of design freedom.

BRIEF SUMMARY OF THE INVENTION

In view of the above-mentioned problems, the present invention is intended to provide a rack-and-pinion steering apparatus capable of effectively reducing reverse input, such as kickback and flutter, while a high degree of design freedom is secured.

For the purpose of attaining the above-mentioned object, a rack-and-pinion steering apparatus in accordance with a first invention, which includes pinion teeth provided on the circumferential face of a pinion shaft; and rack teeth provided on the outer face of a rack shaft and engaged with the pinion teeth, wherein the rotation of the pinion shaft connected to a steering member is transmitted to the rack shaft via the engagement portions of the pinion teeth and the rack teeth; the rack shaft is moved in the axial direction thereof to steer; the sum of the tilt angle of the rack tooth with respect to a reference line perpendicular to the axial line of the rack shaft and the tilt angle of the pinion tooth with respect to the axial line of the pinion shaft does not coincide with the tilt angle of the axial line of the pinion shaft with respect to the reference line; and crowning is given in the direction of tooth trace on the tooth surface of the rack tooth (or the pinion tooth) in order to decrease the tooth width on one end side in the direction of tooth trace and to increase the tooth width on the other end side according to the state of contact with the pinion tooth (or the rack tooth) opposed thereto.

In the rack-and-pinion steering apparatus in accordance with the first invention, in order that the sum of the tilt angle of the rack tooth (rack helix angle) with respect to the reference line perpendicular to the axial line of the rack shaft and the tilt angle of the pinion tooth (pinion helix angle) with respect to the axial line of the pinion shaft does not coincide with the tilt angle of the axial line of the pinion shaft (housing intersection angle) with respect to the reference line, a correction angle is provided in any one of the rack helix angle, the pinion helix angle and the housing intersection angle. Furthermore, for the purpose of increasing the degree of close contact with the pinion tooth (or the rack tooth), crowning is given in the direction of tooth trace on the tooth surface of the rack tooth (or the pinion tooth) in order to decrease the tooth width on one end side in the direction of tooth trace and to increase the tooth width on the other end side. Hence, in reverse input, such as kickback and flutter, transmitted via the rack shaft, a component thereof transmitted to the pinion shaft can be relieved.

In other words, in the case that a reverse input vector in the axial direction of the rack shaft is resolved into a component in the axial direction of the pinion shaft and a component perpendicular to the pinion shaft, the correction angle is given to reduce the component perpendicular to the pinion shaft. Hence, the limiting condition for stroke ratio can be relieved, and reverse input, such as kickback and flutter, transmitted via the rack shaft can be absorbed.

Furthermore, for the purpose of increasing the degree of close contact with the pinion tooth (or the rack tooth), crowning is given in the direction of tooth trace on the tooth surface of the rack tooth (or the pinion tooth) in order to decrease the tooth width on one end side in the direction of tooth trace and to increase the tooth width on the other end side. Therefore, even in the case that the correction angle is provided, the movement conversion between the pinion shaft and the rack shaft can be maintained properly while the state of the contact between the rack tooth and the pinion tooth is prevented from becoming deteriorated and reverse input, such as kickback and flutter, is relieved.

A rack-and-pinion steering apparatus in accordance with a second invention is the rack-and-pinion steering apparatus in accordance with the first invention comprising means for increasing/decreasing the tilt angle of the axial line of the pinion shaft with respect to the reference line.

A rack-and-pinion steering apparatus in accordance with a third invention is the rack-and-pinion steering apparatus in accordance with the first invention comprising means for increasing/decreasing the tilt angle of the rack tooth with respect to the reference line perpendicular to the axial line of the rack shaft or the tilt angle of the pinion tooth with respect to the axial line of the pinion shaft.

In the rack-and-pinion steering apparatus in accordance with the second invention, the tilt angle of the axial line of the pinion shaft with respect to the reference line, that is, the housing intersection angle, is increased/decreased, whereby the correction angle is formed. Furthermore, in the rack-and-pinion steering apparatus in accordance with the third invention, the tilt angle of the rack tooth with respect to the reference line perpendicular to the axial line of the rack shaft, that is, the rack helix angle, is increased/decreased; or the tilt angle of the pinion tooth with respect to the axial line of the pinion shaft, that is, the pinion helix angle, is increased/decreased, whereby the correction angle is formed. Hence, the sum of the rack helix angle and the pinion helix angle does not coincide with the housing intersection angle. Therefore, in reverse input, such as kickback and flutter, transmitted via the rack shaft, a component thereof transmitted to the pinion shaft can be relieved.

In the present invention, as described above, in reverse input, such as kickback and flutter, transmitted via the rack shaft, a component thereof transmitted to the pinion shaft can be relieved, whereby the reverse input, such as kickback and flutter, can be absorbed.

Still further, for the purpose of increasing the degree of close contact with the pinion tooth (or the rack tooth), crowning is given in the direction of tooth trace on the tooth surface of the rack tooth (or the pinion tooth) in order to decrease the tooth width on one end side in the direction of tooth trace and to increase the tooth width on the other end side. Therefore, even in the case that the correction angle is provided, the movement conversion between the pinion shaft and the rack shaft can be maintained properly while the state of the contact between the rack tooth and the pinion tooth is prevented from becoming deteriorated and reverse input, such as kickback and flutter, is relieved.

The above and further objects and features of the invention will more fully be apparent from the following detailed description with accompanying drawings.

DETAILED DESCRIPTION OF THE INVENTION

Figure 1:
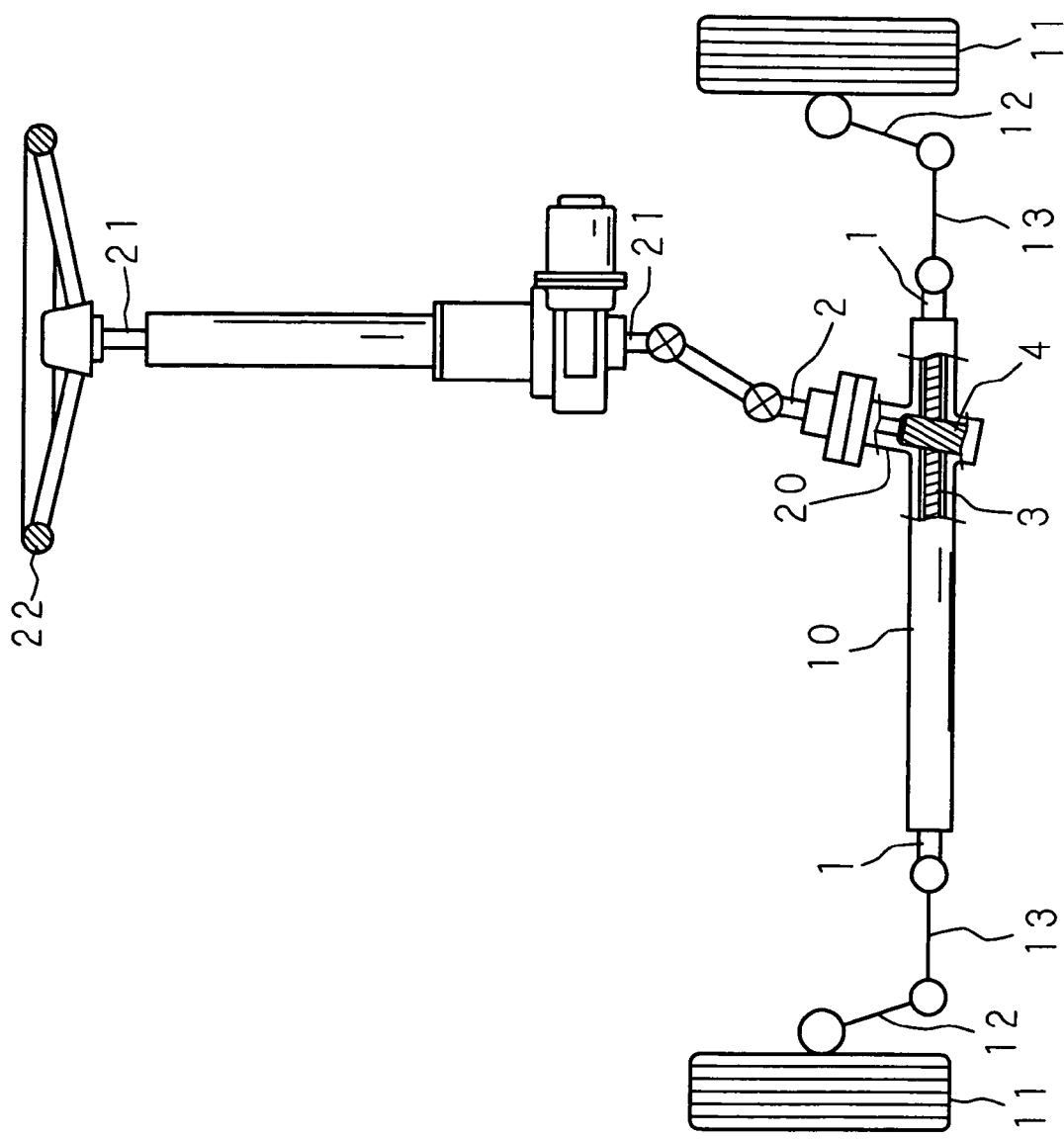
FIG. 1 is a schematic view showing an overall configuration of a rack-and-pinion steering apparatus in accordance with an embodiment of the present invention.

The present invention will be described below on the basis of the drawings showing embodiments thereof. FIG. 1 is a schematic view showing an overall configuration of a rack-and-pinion steering apparatus in accordance with an embodiment of the present invention.

In the rack-and-pinion steering apparatus shown in FIG. 1, a rack shaft 1 is supported inside a rack housing 10 having a cylindrical shape so as to be movable in the axial direction thereof. The rack housing 10 is extended in the right-left direction of a chassis (not shown). Both ends of the rack shaft 1, protruding on both sides of the rack housing 10, are connected via tie rods 13 and 13 to the knuckle arms 12 and 12 of right and left front wheels 11 and 11 serving as wheels to be steered, respectively.

In the vicinity of one end portion of the rack housing 10, a pinion housing 20 is connected to the rack housing 10 so as to intersect with the axial center thereof. Inside the pinion housing 20, a pinion shaft 2 is supported so as to be rotatable around its axis. A part of the pinion shaft 2 protrudes by an appropriate length to the upper part of the pinion housing 20, and the protruding end portion is connected via a column shaft 21 to a steering wheel 22 serving as a steering member.

An appropriate length of the lower half portion of the pinion shaft 2 extended to the inside of the pinion housing 20 is enlarged in diameter, and pinion teeth 4 are formed on the outer circumferential face of the portion enlarged in diameter. Furthermore, rack teeth 3 are formed on the rack shaft 1 supported inside the rack housing 10, including the portion opposed to the pinion shaft 2, along an appropriate length. The rack teeth 3 are engaged with the pinion teeth 4 provided on the circumferential face of the pinion shaft 2.

With the above-mentioned configuration, in the case that the steering wheel 22 for steering is rotated, the pinion shaft 2 connected to the steering wheel 22 via the column 21 is rotated. This rotation is converted into the movement of the rack shaft 1 in the axial direction thereof at the engagement portions of the pinion teeth 4 and the rack teeth 3, whereby the rack shaft 1 is moved in both the right and left directions.

The above-mentioned movement of the rack shaft 1 is transmitted to the right and left knuckle arms 12 and 12 via the tie rods 13 and 13 connected to both ends of the rack shaft 1. Hence, the right and left front wheels 11 and 11 are steered by the push-pull operation of the knuckle arms 12 and 12 to an angle corresponding to the amount of steering operation according to the operation direction of the steering wheel 22.

The rack-and-pinion steering apparatus in accordance with this embodiment is characterized by the formation of the rack teeth 3 on the rack shaft 1 and the pinion teeth 4 on the pinion shaft 2, the rack shaft 1 and the pinion shaft 2 being rotated when the operation force of the steering wheel 22 is applied thereto.

Figure 2:
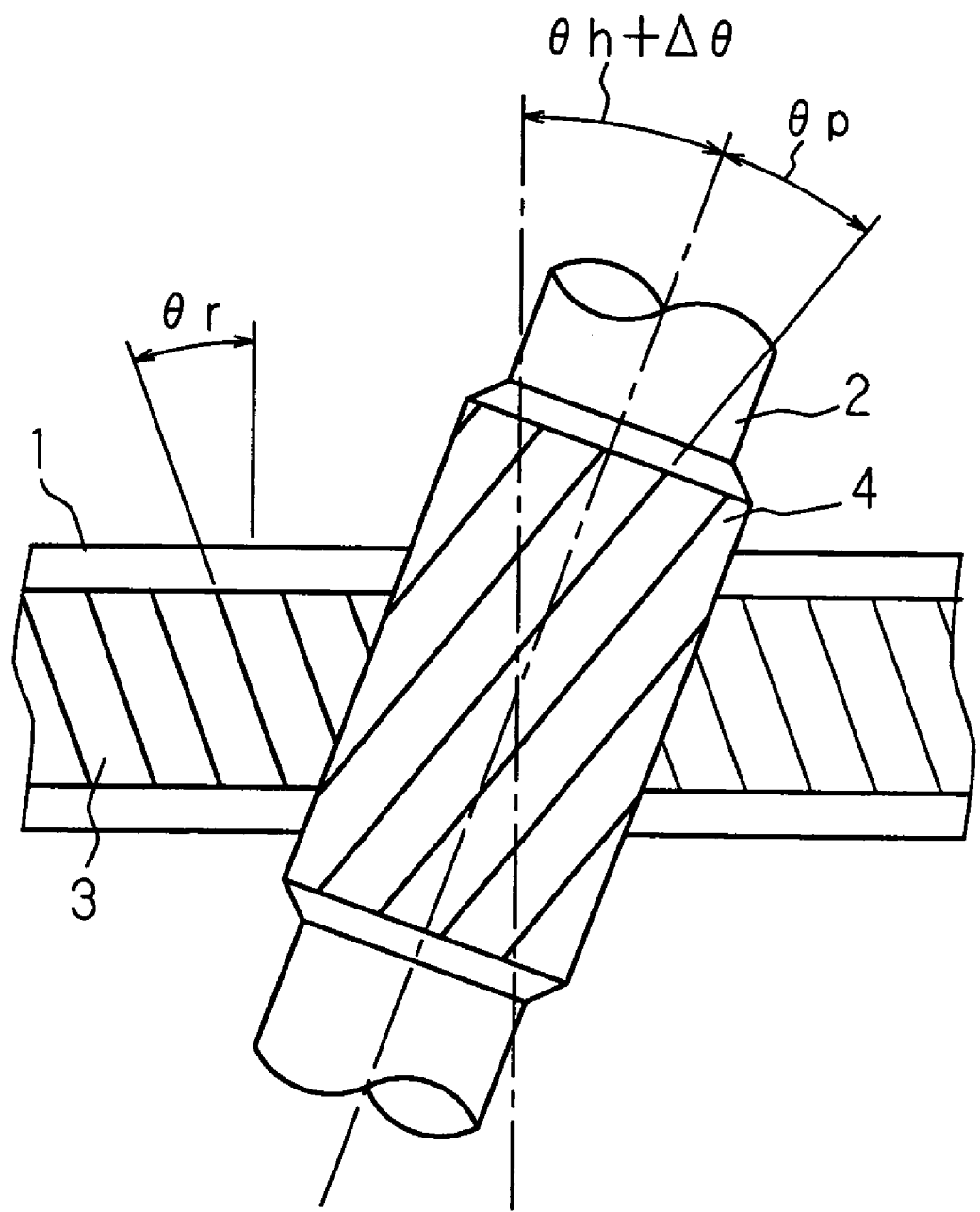
FIG. 2 is an enlarged view showing the intersection portion of a rack shaft and a pinion shaft, and the vicinity thereof.

FIG. 2 is an enlarged view showing the intersection portion of the rack shaft 1 and the pinion shaft 2, and the vicinity thereof. As schematically shown in this figure, the pinion teeth 4 provided on the pinion shaft 2 are formed as helical teeth having a predetermined pinion helix angle θp with respect to the axial line of the pinion shaft 2. Furthermore, the rack teeth 3 provided on the rack shaft 1 are formed as slanting teeth tilting at a rack helix angle θr corresponding to the pinion helix angle θp with respect to the direction perpendicular to the axial direction of the rack shaft 1. The rack teeth 3 provided on the rack shaft 1 are engaged with the pinion teeth 4 at the portion intersecting with the pinion shaft 2.

In addition, a housing intersection angle θh conventionally coincident with the sum of the pinion helix angle θp and the rack helix angle θr is corrected by Δθ. In other words, the pinion housing 20 intersecting with the rack housing 10 with respect to the axial center thereof is connected at a housing intersection angle θh±Δθ, whereby the intersection angle is made different. Hence, the pinion helix angle θp, the rack helix angle θr and the housing intersection angle θh satisfy the relationship of (expression 1). The measurement start points of the pinion helix angle θp, the rack helix angle θr and the housing intersection angle θh are the axial line of the pinion shaft, the reference line perpendicular to the axial line of the rack shaft and the reference line perpendicular to the axial line of the rack shaft, respectively. It is assumed that the clockwise direction viewed from above of FIG. 2 is positive and that the counterclockwise direction is negative.

$$\theta p + (-\theta r) = \theta h \pm \Delta \theta \quad \text{(Expression 1)}$$

However, the correction is not limited to the correction of the intersection angle between the rack housing 10 and the pinion housing 20 by Δθ, but may be the correction of the pinion helix angle θp by Δθ or the correction of the rack helix angle θr by Δθ. The important point is that the sum of the pinion helix angle θp and the rack helix angle θr should only be determined so as not to coincide with the housing intersection angle θh. Furthermore, it is preferable that the correction angle Δθ should range from −1 degree or more to 1 degree or less.

Figure 3:
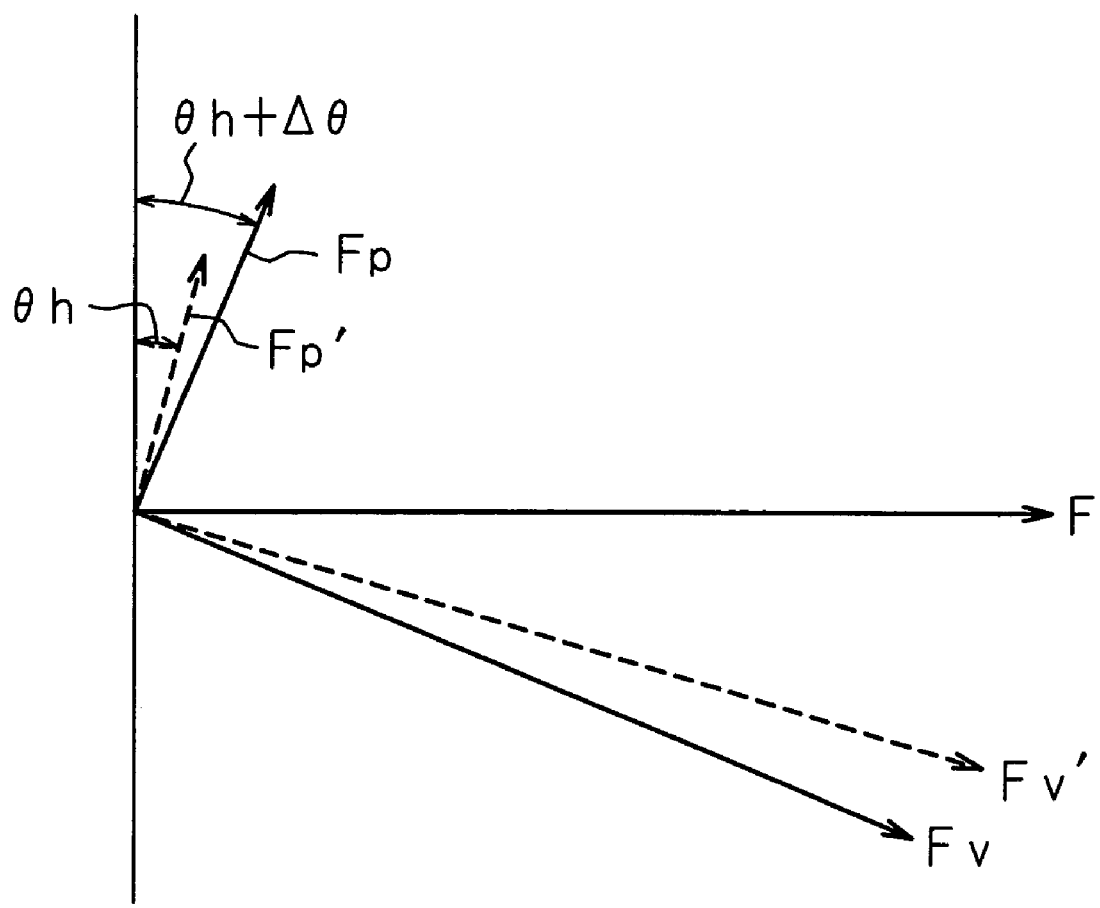
FIG. 3 is a view exemplifying the resolution of the components of a reverse input vector in the axial direction of the rack shaft.

In the case that a reverse input vector in the axial direction of the rack shaft 1 is resolved into a component in the axial direction of the pinion shaft 2 and a component perpendicular to the pinion shaft 2, the above-mentioned correction angle Δθ is given to reduce the component perpendicular to the pinion shaft 2. FIG. 3 is a view exemplifying the resolution of the components of the reverse input vector in the axial direction of the rack shaft 1.

The solid lines in FIG. 3 show a state wherein the reverse input vector F in the axial direction of the rack shaft 1 is resolved into the component Fp in the axial direction of the pinion shaft 2 and the component Fv perpendicular to the pinion shaft 2 in the case of correcting for increasing the housing intersection angle θh by Δθ. The broken lines in FIG. 3 show a state wherein the reverse input vector F in the axial direction of the rack shaft 1 is resolved into the component Fp' in the axial direction of the pinion shaft 2 and the component Fv' perpendicular to the pinion shaft 2 in the case that the sum of the pinion helix angle θp and the rack helix angle θr coincides with the housing intersection angle θh. Also in FIG. 3, the measurement start points of the pinion helix angle θp, the rack helix angle θr and the housing intersection angle θh are the axial line of the pinion shaft, the reference line perpendicular to the axial line of the rack shaft and the reference line perpendicular to the axial line of the rack shaft, respectively. It is assumed that the clockwise direction viewed from above of FIG. 2 is positive and that the counterclockwise direction is negative. For the sake of simplicity, the pinion helix angle θp, the rack helix angle θr and the housing intersection angle θh are assumed to be absolute values and explained as follows.

As clarified by the comparison between the solid lines and the broken lines, with respect to the components perpendicular to the pinion shaft 2, the component Fv (solid line), in the case of correcting for increasing the housing intersection angle θh by Δθ, is smaller than the component Fv' (broken line) in the case that the sum of the pinion helix angle θp and the rack helix angle θr coincides with the housing intersection angle θh. It is thus possible to reduce the reverse input, such as kickback and flutter, transmitted to the driver via the pinion shaft 2.

The case of correcting for increasing the housing intersection angle θh by Δθ is described in the example shown in FIG. 3. However, a similar effect can also be expected even in the case of correcting for decreasing the rack helix angle θr by Δθ or in the case of correcting for decreasing the pinion helix angle θp by Δθ.

Figure 4:
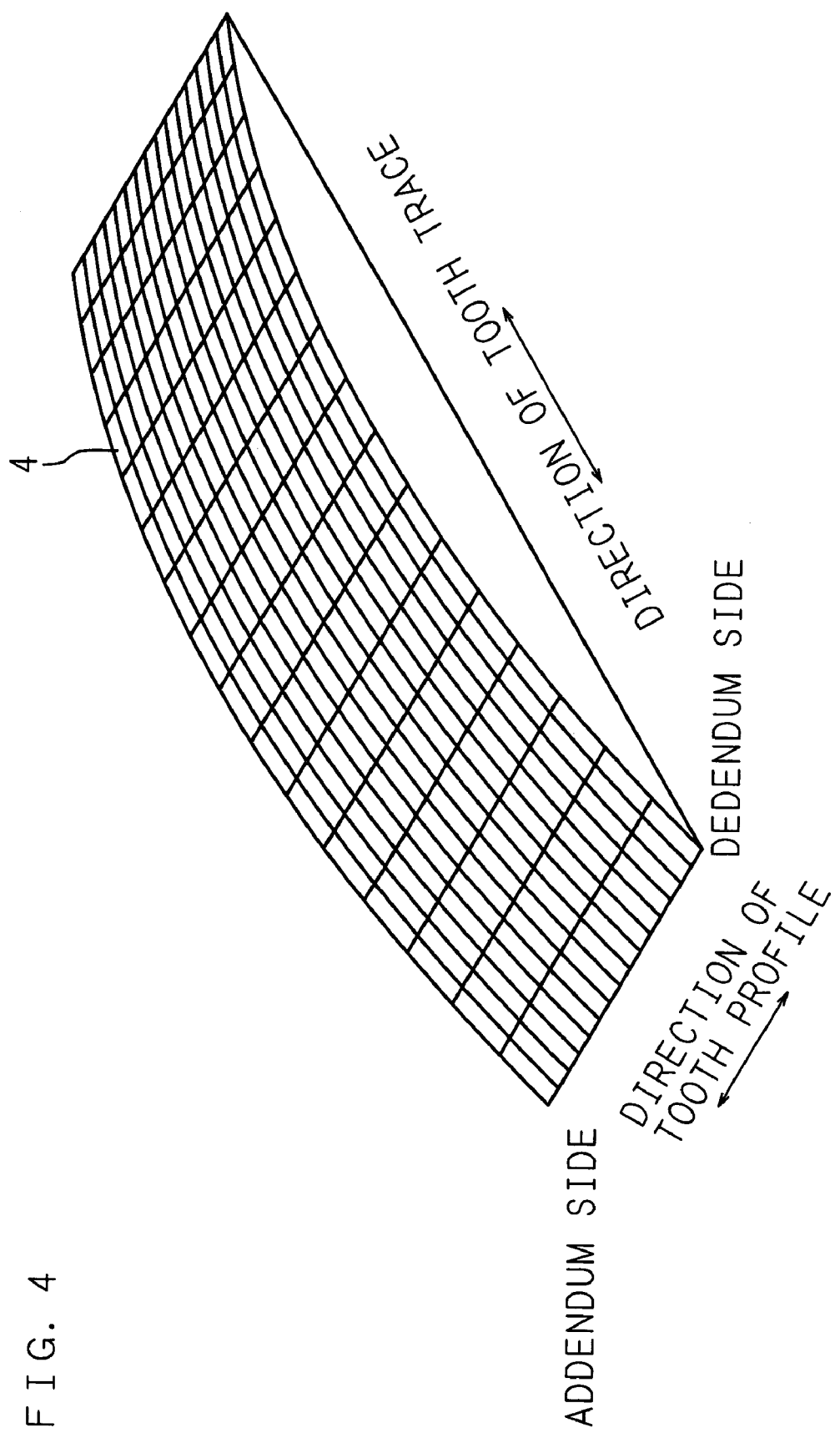
FIG. 4 is a view showing the surface shape of a pinion tooth subjected to crowning.
Figure 5:
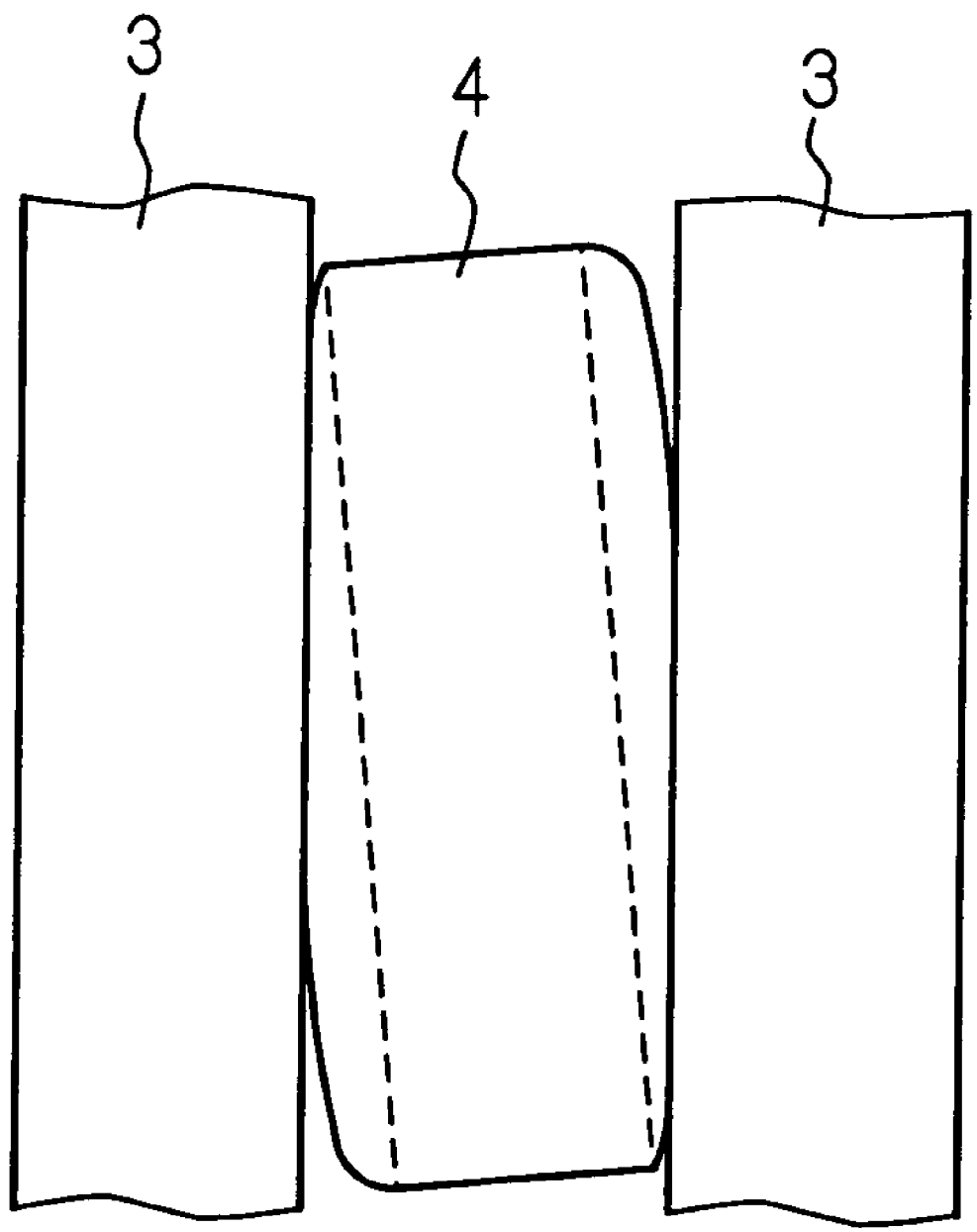
FIG. 5 is a schematic view showing the contact state of the pinion tooth subjected to crowning.

Furthermore, in the case of reducing the reverse input, such as kickback and flutter, transmitted to the driver via the pinion shaft 2, it is preferable that the transmission efficiency of the positive input transmitted to the rack shaft 1 by the steering operation of the driver should not be lowered. Hence, in this embodiment, crowning depending on the correction angle Δθ is provided on the surfaces of the rack teeth 3 or the pinion teeth 4 so that the transmission efficiency of the positive input transmitted to the rack shaft 1 by the steering operation of the driver is not lowered, in other words, so that the state of contact between the rack teeth 3 and the pinion teeth 4 does not become deteriorated. FIG. 4 is a view showing the surface shape of the pinion tooth 4 subjected to crowning, and FIG. 5 is a schematic view showing the contact state of the pinion tooth 4 subjected to crowning.

In FIG. 4, the surface of the pinion tooth 4 is shown as divided into a mesh lengthwise and crosswise, and a convex portion is formed in the direction of tooth trace. In this embodiment, there is a danger of causing an engagement deviation amounting to the correction angle Δθ in the direction of tooth trace at the portion engaged with the opposed rack tooth 3. To solve this problem, the convex portion formed by crowning is shifted depending on the engagement deviation in the direction of tooth trace from the nearly central position in the direction of tooth trace. The tooth surface on the opposite side of the same tooth is subjected to crowning so as to have a nearly symmetric shape with respect to the center line of the tooth. In other words, as shown in FIG. 5, the state of contact between the rack tooth 3 and the pinion tooth 4 is corrected to a more desirable state using the convex portion obtained by crowning.

In this way, for the purpose of increasing the degree of close contact between the rack tooth 3 and the pinion tooth 4, crowning is given on the tooth surface in order to decrease the tooth width on one end side in the direction of tooth trace and to increase the tooth width on the other end side. Therefore, even in the case that the sum of the pinion helix angle θp and the rack helix angle θr does not coincide with the housing intersection angle θh, the state of the contact between the rack tooth 3 and the pinion tooth 4 can be prevented from becoming deteriorated, the reverse input, such as kickback and flutter, can be relieved, and the movement conversion between the rack shaft 1 and the pinion shaft 2 can be maintained properly.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A rack-and-pinion steering apparatus, which includes:
   pinion teeth provided on the circumferential face of a pinion shaft; and
   rack teeth provided on the outer face of a rack shaft and engaged with said pinion teeth, wherein
   the rotation of said pinion shaft connected to a steering member is transmitted to said rack shaft via the engagement portions of said pinion teeth and said rack teeth;
   said rack shaft is moved in the axial direction thereof to steer;
   a sum of a rack tilt angle $\theta r$ which is a tilt angle of said rack tooth with respect to a reference line perpendicular to an axial line of said rack shaft and a pinion tilt angle $\Delta p$ which is a tilt angle of said pinion tooth with respect to an axial line of said pinion shaft equals a sum of a housing intersecting angle $\theta h$ of a tilt angle of axial line of said pinion shaft with respect to said reference line and a correction angle $\Delta\theta$,
   where the angles $\theta r$ and $\theta h$ are positive in one rotational direction and negative in another reverse rotational direction, reading from the reference line, about an axis perpendicular to both the axial line of said rack shaft and the axial line of said pinion shaft, the angle $\theta p$ is positive in the one rotational direction and negative in the another reverse rotational direction, reading from the axial line, about the axis perpendicular to both the axial lines, and the angle $\Delta\theta$ is different from zero; and
   crowning is given on the tooth surface of said rack tooth in order to decrease the tooth width on one end side in the direction of tooth trace and to increase the tooth width on the other end side according to the state of contact with said pinion tooth opposed thereto.

2. A rack-and-pinion steering apparatus, which includes:
   pinion teeth provided on the circumferential face of a pinion shaft; and
   rack teeth provided on the outer face of a rack shaft and engaged with said pinion teeth, wherein
   the rotation of said pinion shaft connected to a steering member is transmitted to said rack shaft via the engagement portions of said pinion teeth and said rack teeth;
   said rack shaft is moved in the axial direction thereof to steer;
   a sum of a rack tilt angle $\theta r$ which is a tilt angle of said rack tooth with respect to a reference line perpendicular to an axial line of said rack shaft and a pinion tilt angle $\theta p$ which is a tilt angle of said pinion tooth with respect to an axial line of said pinion shaft equals a sum of a housing intersecting angle $\theta h$ of a tilt angle of axial line of said pinion shaft with respect to said reference line and a correction angle $\Delta\theta$,
   where the angles $\theta r$ and $\theta h$ are positive in one rotational direction and negative in another reverse rotational direction, reading from the reference line, about an axis perpendicular to both the axial line of said rack shaft and the axial line of said pinion shaft, the angle $\theta p$ is positive in the one rotational direction and negative in the another reverse rotational direction, reading from the axial line, about the axis perpendicular to both the axial lines, and the angle $\Delta\theta$ is different from zero; and
   crowning is given on the tooth surface of said pinion tooth in order to decrease the tooth width on one end side in the direction of tooth trace and to increase the tooth width on the other end side according to the state of contact with said rack tooth opposed thereto.

3. A rack-and-pinion steering apparatus in accordance with claim 1, comprising means for increasing/decreasing the tilt angle of the axial line of said pinion shaft with respect to said reference line.

4. A rack-and-pinion steering apparatus in accordance with claim 2, comprising means for increasing/decreasing the tilt angle of the axial line of said pinion shaft with respect to said reference line.

5. A rack-and-pinion steering apparatus in accordance with claim 1, comprising means for increasing/decreasing the tilt angle of said rack tooth with respect to the reference line perpendicular to the axial line of said rack shaft.

6. A rack-and-pinion steering apparatus in accordance with claim 2, comprising means for increasing/decreasing the tilt angle of said rack tooth with respect to the reference line perpendicular to the axial line of said rack shaft.

7. The rack-and-pinion steering apparatus in accordance with claim 1, wherein the correction angle $\Delta\theta$ is set as a predetermined value such that a component, in a direction of the axis of said pinion shaft, of a reverse input vector which aligns with the axis of said rack shaft, is larger than a component of the reverse input vector in a direction perpendicular to the axis of said pinion shaft.

8. The rack-and-pinion steering apparatus in accordance with claim 2, wherein the correction angle $\Delta\theta$ is set as a predetermined value such that a component, in a direction of the axis of said pinion shaft, of a reverse input vector which aligns with the axis of said rack shaft, is larger than a component of the reverse input vector in a direction perpendicular to the axis of said pinion shaft.

9. A rack-and-pinion steering apparatus, which includes:
   pinion teeth provided on the circumferential face of a pinion shaft; and
   rack teeth provided on the outer face of a rack shaft and engaged with said pinion teeth, wherein
   the rotation of said pinion shaft connected to a steering member is transmitted to said rack shaft via the engagement portions of said pinion teeth and said rack teeth;
   said rack shaft is moved in the axial direction thereof to steer;
   a sum of a rack tilt angle $\theta r$ which is a tilt angle of said rack tooth with respect to a reference line perpendicular to an axial line of said rack shaft and a pinion tilt angle $\theta p$ which is a tilt angle of said pinion tooth with respect to an axial line of said pinion shaft equals a difference between a housing intersecting angle $\theta h$ of a tilt angle of axial line of said pinion shaft with respect to said reference line and a correction angle $\Delta\theta$,
   where the angles $\theta r$ and $\theta h$ are positive in one rotational direction and negative in another reverse rotational direction, reading from the reference line, about an axis perpendicular to both the axial line of said rack shaft and the axial line of said pinion shaft, the angle $\theta p$ is positive in the one rotational direction and negative in the another reverse rotational direction, reading from the axial line, about the axis perpendicular to both the axial lines, and the angle $\Delta\theta$ is different from zero; and
   crowning is given on the tooth surface of said rack tooth in order to decrease the tooth width on one end side in the direction of tooth trace and to increase the tooth width on the other end side according to the state of contact with said pinion tooth opposed thereto.

10. A rack-and-pinion steering apparatus, which includes:
    pinion teeth provided on the circumferential face of a pinion shaft; and
    rack teeth provided on the outer face of a rack shaft and engaged with said pinion teeth, wherein the rotation of said pinion shaft connected to a steering member is transmitted to said rack shaft via the engagement portions of said pinion teeth and said rack teeth;

said rack shaft is moved in the axial direction thereof to steer;

a sum of a rack tilt angle $\theta r$ which is a tilt angle of said rack tooth with respect to a reference line perpendicular to an axial line of said rack shaft and a pinion tilt angle $\theta p$ which is a tilt angle of said pinion tooth with respect to an axial line of said, pinion shaft equals a difference between a housing intersecting angle $\theta h$ of a tilt angle of axial line of said pinion shaft with respect to said reference line and a correction angle $\Delta\theta$, where the angles $\theta r$ and $\theta h$ are positive in one rotational direction and negative in another reverse rotational direction, reading from the reference line, about an axis perpendicular to both the axial line of said rack shaft and the axial line of said pinion shaft, the angle $\theta p$ is positive in the one rotational direction and negative in the another reverse rotational direction, reading from the axial line, about the axis perpendicular to both the axial lines, and the angle $\Delta\theta$ is different from zero; and crowning is given on the tooth surface of said pinion tooth in order to decrease the tooth width on one end side in the direction of tooth trace and to increase the tooth width on the other end side according to the state of contact with said rack tooth opposed thereto.

\* \* \* \* \*